US006484316B1

(12) United States Patent
Lindberg

(10) Patent No.: US 6,484,316 B1
(45) Date of Patent: Nov. 19, 2002

(54) TELEVISION AUDIENCE MONITORING SYSTEM AND APPARATUS AND METHOD OF ALIGNING A MAGNETIC PICK-UP DEVICE

(75) Inventor: Conrad Lindberg, San Diego, CA (US)

(73) Assignee: ADcom Information Services, Inc., Deerfield Beach, FL (US)

( * ) Notice: Subject to any disclaimer, the term of this patent is extended or adjusted under 35 U.S.C. 154(b) by 0 days.

(21) Appl. No.: 09/172,482

(22) Filed: Oct. 14, 1998

(51) Int. Cl.[7] .................. H04N 9/00

(52) U.S. Cl. .................. 725/17; 725/18; 348/94; 455/2

(58) Field of Search .................. 725/17, 18; 348/94; 455/2

(56) References Cited

U.S. PATENT DOCUMENTS

| | | | | |
|---|---|---|---|---|
| 4,485,442 A | * 11/1984 | Snaper et al. | | |
| 4,599,644 A | 7/1986 | Fischer | 358/84 |
| 4,605,958 A | 8/1986 | Machnik et al. | 358/84 |
| 4,613,904 A | 9/1986 | Lurie | 358/142 |
| 4,642,685 A | 2/1987 | Roberts et al. | 358/84 |
| 4,764,808 A | 8/1988 | Solar | 358/84 |
| 4,847,685 A | 7/1989 | Gall et al. | 358/84 |
| 4,907,079 A | 3/1990 | Turner et al. | 358/84 |
| 4,912,552 A | 3/1990 | Allison, III et al. | 358/84 |
| 5,199,031 A | * 3/1993 | Dahlin | |
| 5,294,981 A | 3/1994 | Yazolino et al. | 348/4 |
| 5,305,464 A | 4/1994 | Frett | 455/2 |
| 5,329,370 A | 7/1994 | Yazolino et al. | 548/734 |
| 5,374,951 A | 12/1994 | Welsh | 348/4 |
| 5,382,970 A | 1/1995 | Kiefl | 348/1 |
| 5,388,101 A | * 2/1995 | Dinkins | |
| 5,481,546 A | * 1/1996 | Dinkins | |
| 5,495,282 A | 2/1996 | Mostafa et al. | 348/5 |
| 5,689,799 A | 11/1997 | Dougherty et al. | 455/2 |
| 5,737,363 A | * 4/1998 | Dinkins | |
| 5,872,588 A | 2/1999 | Aras et al. | 342/1 |
| 5,880,768 A | 3/1999 | Lemmons et al. | 348/1 |
| 5,881,360 A | 3/1999 | Fong | 455/2 |
| 5,945,988 A | 8/1999 | Williams et al. | 348/10 |

FOREIGN PATENT DOCUMENTS

| | | |
|---|---|---|
| DE | 24 52 926 | 5/1976 |
| DE | 3401 762 A1 | 8/1985 |
| DE | 37 42 426 A1 | 6/1989 |
| EP | 0 064 847 A2 | 11/1982 |
| EP | 0 127 068 | 12/1984 |
| EP | 0 430 711 A2 A3 | 6/1991 |
| EP | 0 687 083 | 12/1995 |
| EP | 0 763 950 | 3/1997 |
| FR | 2 555 383 | 5/1985 |
| FR | 2 717 025 | 9/1995 |
| FR | 2 738 977 | 3/1997 |
| GB | 2206253 A | 12/1988 |
| WO | WO 91/11062 | 7/1991 |
| WO | WO 94/14284 | 6/1994 |
| WO | WO 97/45973 | 12/1997 |
| WO | WO98/31114 | 7/1998 |

* cited by examiner

*Primary Examiner*—Andrew Faile
*Assistant Examiner*—Kieu-Oanh Bui
(74) *Attorney, Agent, or Firm*—Woodcock Washburn LLP

(57) ABSTRACT

A signal strength meter for use in determining an optimal position of a magnetic pick-up device. The signal strength meter includes a vertical synchronization processing circuit, and audio processing circuit and a power and control circuit. The signal strength meter receives vertical synchronization and audio signals radiated from a television set, as well as an audio test signal directly provided by a pattern generator. The signal strength meter determines parameters such as a phase stability of the vertical synchronization signal detected by the pick-up device, a level of the audio signal detected by the pick-up device, an audio phase measurement of the audio signal sensed by the pick-up device with respect to an audio test signal input directly to the signal strength meter, and an audio noise floor measurement.

32 Claims, 5 Drawing Sheets

TELEVISION AUDIENCE MONITORING SYSTEM AND APPARATUS AND METHOD OF ALIGNING A MAGNETIC PICK-UP DEVICE

FIELD OF THE INVENTION

The present invention relates to a device for monitoring usage of audiovisual equipment. In particular, the present invention relates to automating the process of positioning a magnetic pick-up device that monitors radiation emitted from a television set. The magnetic pick-up device is used as part of a television audience monitoring system to determine a channel to which a television set, set-top converter box or video cassette recorder is tuned.

BACKGROUND OF THE INVENTION

Determining a number of viewers watching a particular television program is of great importance to television networks, stations, programmers and advertisers. Information regarding the number of viewers is used to determine market share and the ratings of particular programs. This information is additionally used to determine advertising rates, which in turn affects the revenue generated by the television networks and stations.

There are numerous systems known in the art that attempt to monitor the viewing habit of television watchers. Early attempts at monitoring were fairly simple and unsophisticated, and generally required viewers to maintain a diary of programs watched. As the viewers began and finished watching a particular channel or program, they entered a start and end time in to the diary. The viewers periodically mailed the diaries to a central collection location, which then processed the diaries. The disadvantages of such a system are many, including: failure to enter information into the diaries, inaccurate entries into the diaries, and delays in processing. Further, as the number of channels provided to households has increased dramatically, it has become increasingly difficult for viewers to accurately track their viewing habits.

Later attempts have become more sophisticated and efficient by automating portions of the data collection process and the determination of the channel currently being viewed. For example, U.S. Pat. No. 4,642,685, to Roberts et al., discloses a television monitoring system having a channel detection unit, a people monitoring unit, a transmission unit, and a receiving unit. The channel detection unit detects ultra or very high frequency radiation emitted from a television tuner to determine if the channel being tuned is one of the channels which have been preset into the detection unit. The detection is performed by a pick-up probe that inductively couples the signal emitted from the local oscillator of the television receiver. The people monitor unit is a powered handset that includes buttons assigned to each of the individuals who will be viewing the television set. The viewer depresses his or her assigned button to indicate he or she has started to watch the television. The viewing data is stored and transmitted by the transmission unit over household wiring to the receiving unit. The receiving unit sends the collected information to a central computer via a telephone connection. While this system speeds the data transmission process to the central computer as compared to mailing diaries to a processing center, there are several disadvantages in this system. For example, those of skill in the art will recognize that the location of the pick-up probe will greatly affect the sensitivity and accuracy of the channel detection unit. Further, as each viewer must manually depress a button on the people monitor, it is subject to the same inaccuracies of the diary method noted above, i.e., the failure of viewers to record the television channels actually watched.

U.S. Pat. No. 4,907,079, to Tuner et al., describes networked conventional audio and visual equipment that communicate via telephone lines with a remote central computer. The viewer provides channel selection commands or other programming commands to a microprocessor through an infrared remote control. A VCR tuner and TV tuner within the system provide audio and video signals for the conventional television monitor or television receiver. An AM and FM radio tuner may also be included, tunable by the microprocessor. In the Tuner et al. system, the video and/or audio signals from each tuner, video tape player, and disc players are coupled to the input side of an audio switch and a video switch. The switches are microprocessor controlled so that the audio and video program from any source may be coupled to any output or display device at the viewing location. The system includes a motion detector to determine the presence of viewers and provides for communication with a remote computer to monitor use of each networked audiovisual unit. While this system provides for monitoring and logging of each networked audiovisual unit, the Tuner et al. system is designed to control a large home-entertainment system, rather than a small-scale solution to monitoring viewers' habits. In particular, the Turner et al. system is indicated to cost a few hundred dollars, and would fail to provide a solution to television networks and advertisers who are interested in obtaining accurate viewing statistics by deploying systems to a relatively large number of viewers.

U.S. Pat. No. 4,912,552, to Allison, III, et al., describes a system that collects television channel tuning data that transmits the data to a central site in a transparent manner to the occupants of the household. The system is designed having a hub and spoke architecture, where the hub unit communicates with metering devices attached to television receivers and/or cable television converters. The meters are periodically polled by the hub, which then collects the data acquired by each meter. The hub communicates with a host computer via standard telephone lines. The Allison, III, et al. system particularly describes the central hub device and gathering data before transmitting it to the central site. However, the Allison, III et al. system fails to provide an improved metering unit by contemplating the use of known channel meters.

U.S. Pat. No. 5,374,951, to Welsh, discloses a system for monitoring and recording data related to television program viewing habits that includes a plurality of remote program monitor units that automatically report such data to a central computer via a conventional telephone network. The monitor unit reads a character string that is decoded from the demodulated television signal received by the unit. The character string is compared to a string table stored within the unit to determine the content being viewed by the television watcher. If there is a match, an event code and a time are stored in the unit for reporting to the central computer. However, for the system to operate, the character string must be encoded into the received television signal, otherwise there will be no match with the string table stored in memory. Further, the string table must be kept current for the system to provide accurate results.

U.S. Pat. No. 5,382,970, to Kiefl, describes a system for monitoring and collecting data on the viewing habits of television viewers that includes a portable personal data collection device that is separate from the television or set-top converter. The personal data collection devices includes a detector for providing a station identifier identifying the particular broadcast signal being received by the receiver, a clock for providing a signal representing time, a memory for storing data, and a cellular telephone module for communicating with a central location. The cellular telephone module periodically transmits stored data within the device to the central location. The viewer may enter channel information directly into the device, or the device may include a detector for detecting a channel selection signal from a television remote control to change the station identifier stored in memory. While this is an improvement over diaries, this system requires a personal data collection device for each individual watching a particular television set. Further, because the device is physically separate from the television set, the data collected may not be accurate as viewers may either fail to enter channel information or the device may not detect an infrared transmission from the television remote control.

U.S. Pat. No. 5,495,282, to Mostafa, et al., discloses a tuning/monitoring module for monitoring use of a video equipment without the use of probes by injecting RF signals into a cable converter and a VCR in order to detect channels selected by the cable converter and the VCR. In accordance with signals received from the cable converter and the VCR, the tuning/monitoring module can determine a selected channel being viewed by the viewers. Channel identification signals are also injected into the VCR and cable converter for recording by the VCR on videotape. The state of the "TV/VCR" switch of the VCR is determined by injecting a code signal into the VCR and determining whether that signal is present in an RF video signal output by the VCR. The receiver also receives data contained in channel identification signals. The receiver is selectively connectable to the VCR and the cable converter. However, this system requires the use of the special tuning/monitoring module in place of a tuner provided with a television or VCR in order to provided the injected signal to determine the viewed channel. Such a special tuning/monitoring module increases the expense associated with tracking viewers' habits.

In view of the above, there is a need for an integrated solution to detect the channels being watched by viewers. There is also a need for a system that does not interfere with any of the consumer's electronics, equipment or features. In particular, there is a need for a system that provides channel information without requiring addition steps to be taken by viewers, and that functions such that the consumer's VCR, TV, remote controls are not tampered with or opened and continue to operate normally.

SUMMARY OF THE INVENTION

In view of the above, the present invention, through one or more of its various aspects and/or embodiments is thus presented to accomplish one or more objects and advantages, such as those noted below.

In accordance with an aspect of the present invention, there is provided a signal strength metering device for use in positioning a magnetic pick-up device that receives signals radiated from a television set. The signal strength metering device comprises a synchronizing signal processing section that includes a first filter, a first peak amplitude detection circuit, a first edge detection circuit, and a one-shot circuit, where the synchronizing signal processing section receives a vertical synchronizing signal, and the one-shot outputs a blanking signal upon receipt of a first voltage signal from the first edge detection circuit. The first voltage signal is representative of a peak amplitude of the vertical synchronization signal. The signal strength metering device also includes a first audio signal processing circuit that has a second filter, a second peak amplitude detection circuit and a second edge detection circuit. The first audio signal processing circuit receives an audio signal from the television set and the blanking signal, and outputs a second voltage representative of a peak amplitude of the audio signal and a first square wave representation of the audio signal. The signal strength metering device further includes a second audio signal processing circuit that has a blanking circuit and a third edge detector. The second audio signal processing circuit receives a test audio signal and outputs a second square wave representative of the test audio signal. The signal strength metering device additionally includes a controller that receives the second voltage signal representative of the peak amplitude of the audio signal, the first square wave and the second square wave. The controller determines at least one of a quality of the vertical synchronizing signal, a level of the audio signal, a phase of the audio signal, and an audio noise floor measurement.

In accordance with a feature of the invention, the synchronizing signal processing circuit comprises a peak compare circuit having at least one comparator. The peak compare circuit determines if a leading edge of the vertical synchronizing signal is a positive edge having a greater amplitude or if the leading edge is a negative edge having a greater amplitude. In addition, the peak compare circuit may include a dual color LED, wherein if the leading edge of the vertical synchronizing signal is positive and greater in amplitude, the dual color LED is illuminated a first color to indicate the vertical synchronizing signal is in-phase, and wherein if the leading edge is negative and greater in amplitude, the dual color LED is illuminated a second color to indicate the vertical synchronizing signal is out-of-phase.

In accordance with another feature, the first filter comprises a low pass filter and a band pass filter, wherein the band pass filter is tuned to cause the vertical synchronizing signal to ring.

In accordance with a further feature, the first audio signal processing circuit further includes a DC buffering amplifier, wherein the DC buffering amplifier presents a second voltage representative of the peak amplitude of the audio signal to the controller. The second voltage may be sampled by the controller to determine the voltage representative of the peak amplitude of the audio signal. Also, the second voltage may be presented across a capacitor, such that the controller may discharge the capacitor and determine a length of time for the capacitor to recharge to a logic high value to determine the voltage representative of a peak amplitude of the audio signal.

In accordance with yet another feature, the second audio signal processing circuit further comprises a phase inverter, wherein the controller compares a phase of the first square wave output to a phase of the second square wave, and if the first square wave and the second square wave are out-of-phase, then the phase inverter inverts the test audio signal such that it is in-phase with respect to the audio signal.

In accordance with another feature of the invention, the signal strength metering device further comprises an LED display that indicates at least one of the quality of the vertical synchronizing signal, the level of the audio signal, the phase of the audio signal, and the audio noise floor measurement.

The controller may determine the quality of the vertical synchronizing signal,by sampling the blanking signal a predetermined number of times, taking an average of the samples, and comparing the average to an average of a previously determined predetermined number of samples, wherein if a difference between the two averages is less than a first predetermined amount a preferred LED of the LED display is illuminated, wherein if the difference is greater than a second predetermined amount a fail LED of the LED display is illuminated, and wherein if the difference of the two averages falls between the first and second predetermined amounts, a pass LED of the LED display is illuminated.

The level of the audio signal may be determined by sampling the audio signal a predetermined number of times and determining an average of the samples, and wherein an audio indicator LED of the LED display is illuminated to reflect the level of the audio signal.

The phase of the audio signal may be determined by comparing a timing between leading edges of the audio signal and the test audio signal, wherein if the leading edges of the audio signal and the test audio signal are within a predetermined timing window of each other, they are determined to be in-phase and a first LED of the LED display is illuminated, wherein if the leading edge of one signal is within the predetermined timing window of the falling edge of the other signal, they are determined to be in inverted phase and a second LED of the LED display is illuminated, and wherein if the signal edges of the audio signal and the test audio signal fall outside of the predetermined timing window, they are determined to be out-of-phase and a third LED of the LED display is illuminated.

The audio noise floor measurement may be determined by blanking the test audio signal, and an ambient noise level is determined by the microcontroller and displayed by a noise level indicator LED of the LED display.

In accordance with a further feature of the present invention, the signal strength meter is electrically coupled to the magnetic pick-up device and the magnetic pick-up device detects at least one of the synchronization signal and the audio signal, and wherein the magnetic pick-up device provides at least one of the synchronization signal and the audio signal to the signal strength meter. The magnetic pick-up device may be further connected to a viewership meter that has an audio matching circuit that compares a local audio signal of a predetermined channel tuned by the viewership collection meter with the audio signal output by the television to which a set-top converter is connected. If the local audio signal and the audio signal match, the viewership collection meter determines that the channel to which the set-top converter box is tuned is the predetermined channel.

In accordance with a further aspect of the present invention, there is provided a signal strength metering device, comprising first means for processing a synchronizing signal, the first processing means receiving the synchronizing signal and outputting a blanking signal representative of a positive peak value of the synchronizing signal; second means for processing a television audio signal and a test audio signal, the second means receiving the television audio signal and the test signal and outputting a voltage representative of an amplitude of the television audio signal, a first square wave representative of the television audio signal, and a second square wave representative of the test signal; means for controlling the signal strength metering device, the controlling means receiving the blanking signal, the first square wave and the second square wave and determining a quality of the first signal, a level of the second signal, and a phase of the second signal; and means for displaying at least one of the quality of the synchronizing signal, the level of the television audio signal, and the phase of the television audio signal.

According to a feature of the present invention, the controlling means determines the quality of the synchronizing signal by sampling the blanking signal a predetermined number of times, taking an average of the samples, and comparing the average to an average of a previously determined predetermined number of samples, and wherein the controlling means instructs the displaying means to display a result of the comparison of the averages.

According to another feature, the level of the television audio signal is determined by sampling the television audio signal a predetermined number of times and determining an average of the samples, and wherein the controlling means instructs the displaying means to display a result of the comparison of the averages.

According to a further feature, the phase of the television audio signal is determined by comparing a timing between leading edges of the television audio signal and the test audio signal, wherein results of the comparison is displayed by the displaying means.

According to yet another feature, the signal strength meter is electrically coupled to a magnetic pick-up device and the magnetic pick-up device detects at least one of the synchronization signal and the television audio signal, and wherein the magnetic pick-up device provides at least one of the synchronization signal and the television audio signal to the signal strength meter. The magnetic pick-up device may be further connected to a viewership meter that has an audio matching circuit that compares a local audio signal of a predetermined channel tuned by the viewership collection meter with the audio signal output by the television to which a set-top converter is connected. If the local audio signal and the audio signal match, the viewership collection meter determines that the channel to which the set-top converter box is tuned is the predetermined channel.

In accordance with yet another aspect of the present invention, there is provided a signal strength metering device which receives signals from an electronic device. The device comprises a first signal processing circuit that has a first filter, a first peak amplitude detection circuit, a first edge detection circuit and a one-shot circuit. The first signal processing circuit receives a synchronizing signal and outputs a second voltage representative of a peak amplitude of the first signal and a first square wave representation of the first signal. The device also includes a second signal processing circuit that has a second filter, a second peak amplitude detection circuit and a second edge detection circuit. The second signal processing circuit receives an audio signal and the synchronizing signal, and outputs a voltage representative of a peak amplitude of the second signal and a first square wave representation of the second signal, The signal strength meter further includes a third signal processing circuit that has a blanking circuit, a phase inverter and a third edge detector. The third signal processing circuit receives a third signal and outputs a second square wave representative of the third signal. In addition the metering device includes a controller that receives the voltage representative of the peak amplitude of the second signal, the first square wave and the second square wave, and a display comprising a plurality of LEDs. The controller determines at least one of a quality of the first signal, a level of the second signal, and a phase of the second signal, and the display indicates results of the determination of at least one of the quality of the first signal, the level of the second signal, and the phase of the second signal.

Other features of the invention are described below.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings.

DETAILED DESCRIPTION OF THE PREFERRED EMBODIMENTS

The present invention provides a method and apparatus for detecting the currently tuned-to channel of a subscriber's television set, set-top converter box or video cassette recorder. The information related to the detected channel may then be forwarded to a data collection system within the subscriber's home or other location for eventual transmission to a central data collection and compilation site. Such information, taken from a large sample size, may be used to measure network viewing and the interactive environment.

In order to obtain accurate viewership data, it is preferable to gather data from a large sample of subscriber homes within a cable satellite system's broadcast base. The sample is typically derived from demographic and lifestyle characteristics, shopping patterns, and consumer profile of the subscribers' homes. Ideally, the sample of homes from the entire system should represent the system as a whole. To collect data, each of the homes to be sampled may be supplied with a viewership meter (described below). The viewership meter is preferably supplied by ADcom Information Services, Inc., Carlsbad, Calif., and is installed on each television in the sampled homes. Such a meter is quickly and easily installed as compared to other known meters and provides a complete record of viewing in each participating household. When the quantitative ratings from the viewership meters are compiled, the information may be used by advertisers and network programmers to accurately target audiences and determine ideal spot placement for advertisements.

Figure 1:
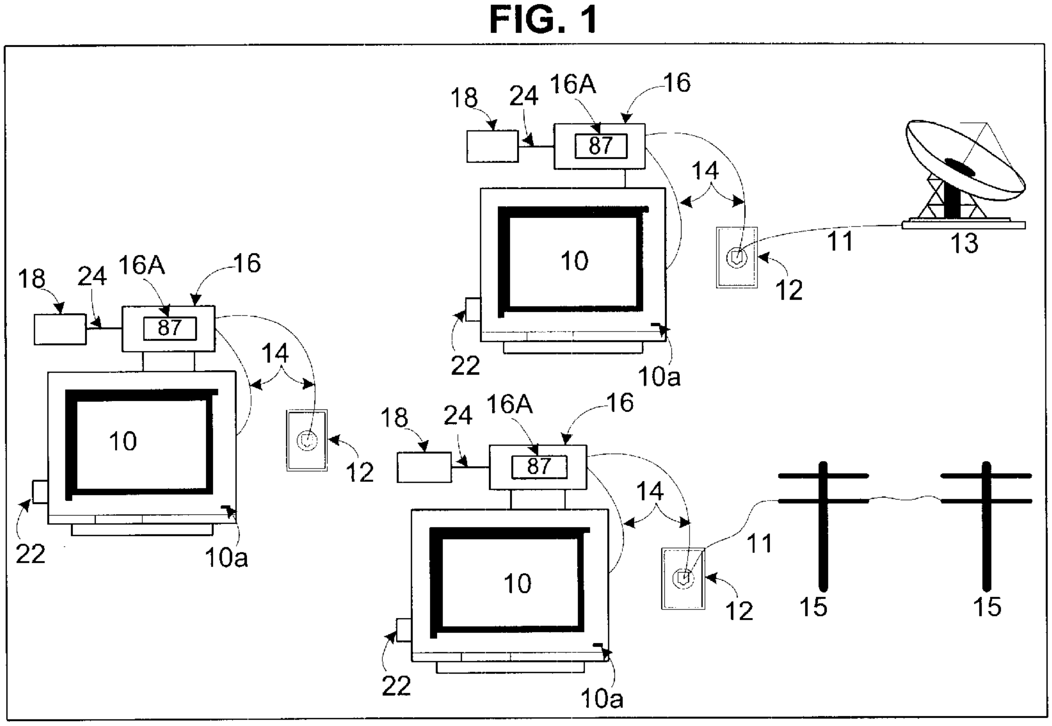
FIG. 1 is an overview of the environment in which the television audience monitoring system of the present invention may be implemented.

Referring to FIG 1, there is illustrated an overview of an environment within which the present invention may be embodied. As illustrated, signals from a satellite/cable system provider are received via transmission lines 11 connected to one of a satellite dish 13 or power poles 15. The satellite dish 13 may receive signals from a plurality of earth orbiting satellites (not shown), whereas the transmission lines strung over power poles 15 (or buried underground) may be connected to a transmission site (not shown). The transmission lines 11 enter the viewer's home or other location and are typically connected to a wall plate 12 having a 75Ω co-axial connector.

To provide a signal to a viewer's television set 10, a first 75Ω co-axial cable 14 electrically connects the transmission line 11, at the wall plate 12, to a first connection on, e.g., the rear panel of a set-top converter box 16. A second 75Ω co-axial cable 14 connects between a second connection on the rear panel of the set-top converter 16 and to, e.g., a 75Ω connector in a television set 10. The set-top converter box 16 is used to selectively tune channels in accordance with a viewer selection. Alternatively, a single 75Ω co-axial cable 14 may be used to provide signals directly to the television set 10. Also as shown, the television set includes an audio-out jack 10*a*.

The set-top converter 16 is connected to a viewership collection meter 18 by wires or a cable 24. Alternatively, an electrical connector or the like may be used in place of wires or cabling 24 to connect the viewership meter 18 and the set-top converter 16. The viewership meter 18 is designed such that it may connect to any television 10 or set-top converter 16. In accordance with an aspect of the present invention, the collection meter 18 determines a viewed channel by receiving channel-related information detected by a vsync/audio pick-up device 22 having a video and audio signal strength meter 40 (described in greater below with regard to FIGS. 2 and 3). The vsync/audio pick-up device 22 is used in-part to monitor television viewership by periodically comparing signals that radiate from the television set 10 (e.g., vsync, hsync or audio signals) with predetermined signals generated by the viewership collection meter 18. When the compared signals match, it is determined by the viewership meter 18 that the viewer is tuned to the television channel associated with the generated predetermined signals. The collection meter 18 is preferably capable of recording the channel location (i.e., the tuned channel) every five seconds, storing the information and forwarding it to a central computer (not shown). The data is forwarded by telephone or other means during time periods when the transmission to the central site is unlikely to interfere with the occupants' use of the transmission media. The central computer collects the data from all viewership meters 18, analyzes the information, combines the records with additional qualitative data, and sends prepared reports to the system operator as early as the next day. Preferably, hundreds, or even thousands of viewership meters 18 may be managed from one central system. Data and reports are received by the system operators via e.g., the Internet and Frame Relay routers. System personnel can quickly generate custom reports that show channel ratings by day, target and network ranking.

Figure 2:
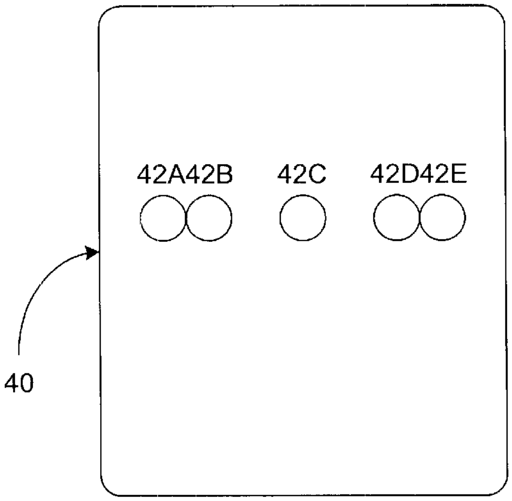
FIG. 2 is a block diagram illustrating a signal strength meter in accordance with the present invention.

Reference is now made to FIG. 2. Proper placement of the vsync/audio pick-up device 22 is critical to ensure that the signals detected by the vsync/audio pick-up device 22 are received without interference such that the viewership collection meter 18 may obtain accurate viewership statistics. In accordance with a feature of the present invention, to aid in the optimal placement of the vsync/audio pick-up device 22, a video and audio strength meter 40 is provided having a plurality of indicia windows 42A–E that contain light emitting diodes (LEDs) or other indicators to display signal strength and characteristics of the detected vsync and audio signals radiating from the television set 10, as well as other information. The LEDs may indicate, e.g., the signal strength and other characteristics detected by the meter 40 by a brightness level, blinking, or color etc., to visually display to an installer if the vsync/audio pick-up device 22 is properly positioned. By including the aforementioned signal strength meter 40 having indicia windows 42A–E, the vsync/audio pick-up device 22 can be optimally positioned with respect to the television set 10 to receive desired signals without interference from other unwanted signals or sources.

The signal strength meter 40 of the present invention will now be explained with reference to FIGS. 3A–C, wherein a vsync signal processing section 44 (FIG. 3A), an audio signal processing section 46 (FIG. 3B), and a power and digital control section 48 (FIG. 3C) are illustrated.

Figure 3A:
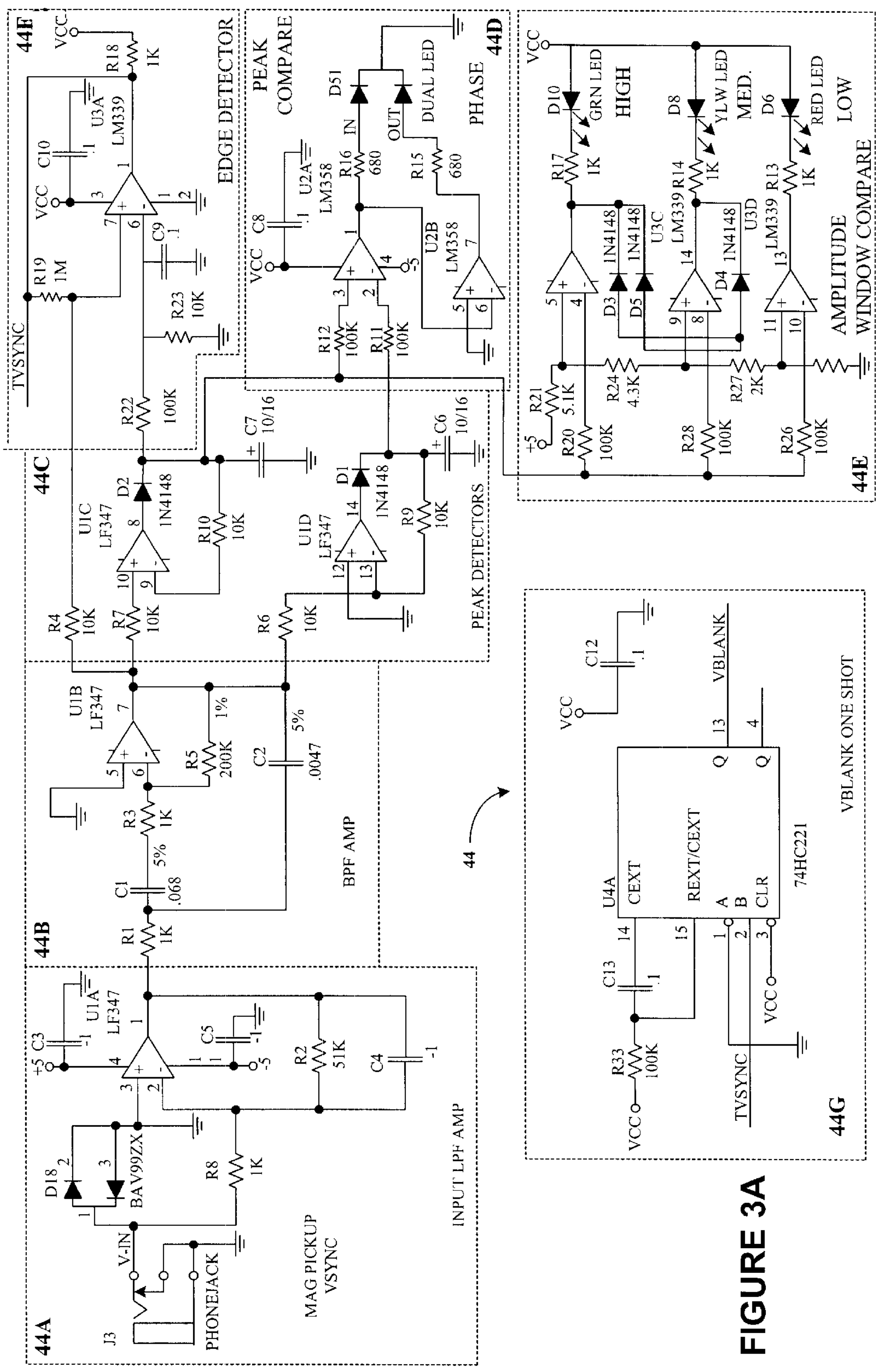
FIGS. 3 A–C are exemplary schematics illustrating the signal strength meter of the present invention.

Referring to FIG. 3A, the vsync signal processing section 44 detects the vertical (vsync) signal which radiates from the television set 10. The television set 10 generates the vsync signal at a frequency of 60 Hz so that the electromagnetic yoke, connected to the picture tube, redirects the scanning electron beam to begin a new frame. The vsync signal may produce undesirable interference with other signals monitored by the signal strength meter 40. As will be discussed below, the vsync signal processing section 44 is provided to detect the occurrence of the vsync signal in order to minimize such interference.

The vsync signal, which radiates from the television set 10, is detected via magnetic coupling provided by the vsync/audio pick-up device 22 and input to a high gain low pass filter amplifier 44A having a 3 dB cut-off frequency of approximately 30 Hz. The low pass filter amplifier 44A comprises an amplifier U1A, a resistor R2 and a capacitor C4. The low pass filter 44A advantageously eliminates high frequency interference that results from e.g., the horizontal sync signal and other signals within and surrounding the television set 10. The detected vsync signal is then passed through a bandpass filter amplifier 44B which passes signals having frequencies between approximately 480 Hz and 810 Hz. The bandpass filter amplifier 44B comprises an amplifier U1V, resistors R3 and R5, and capacitors C1 and C4, and is tuned to cause the detected vsync signal to ring slightly. By causing the detected vsync signal to ring, this reduces the susceptibility of the signal to interfering signals, and also enhances the detection of the phase of the vsync signal.

A peak detector 44C provided to detect the phase of the detected vsync signal in the both the positive and negative directions using inverting and non-inverting comparators U1C and U1D. The comparators U1C and U1D produce two signals (e.g., a positive and negative peak indication signals), each having a positive value representing the absolute amplitude difference between the positive peak and negative peak signals. The two positive signals are compared by a peak compare circuit 44D comprising comparators U2A and U2B, which preferably drive a dual color LED D51 to indicate the phase of the vsync signal. For example, when the leading edge of the vsync signal is positive and greater in amplitude, the LED D51 may be lighted green to indicate that the vsync signal is in-phase. If the leading edge is negative and greater in amplitude, the LED D51 may be lighted red to indicate that the vsync signal is out-of-phase.

The positive peak signal is also input to an amplitude window compare circuit 44E comprising comparators U3B, U3C and U3D that detect the absolute peak amplitude and classify the detected peak amplitude as high, medium or low. The detected absolute peak amplitude is compared to three threshold values as set by a resistive divider network comprising resistors R21, R24, R27 and R25. By incorporating diodes D3–D5 to act as steering logic, the window compare circuit 44E illuminates only one of three LEDs to indicate the classification of the absolute peak amplitude.

An edge detector circuit 44F comprising comparator U3A is provided to disable the audio signal processing circuitry 46 during high noise periods, such as that which occurs when the vsync signal is generated by the television set 10. The edge detector circuit 44F receives a divided down representation (e.g., one-tenth) of the positive peak amplitude that is passed through the bandpass filter amplifier 44B. The signal is divided by resistors R19 and R4. This allows for a wide dynamic range of amplitudes to be input to the edge detector circuit 44F. When the edge detector circuit 44F detects the occurrence of an edge of the vsync signal, a signal TVSYNC is output to a Vblank one shot circuit 44G.

The Vblank one shot circuit 44G contains one shot U4A (e.g., a 74HC221, Dual Non-Retriggerable Monostable Multivibrator with Reset, manufactured by Philips Semiconductors, Sunnyvale, Calif., or similar) which receives the signal TVSYNC and outputs a blanking signal VBLANK to blank the audio signal processing circuitry 46 during the high noise period when the vsync pulse is generated in order to minimize interference. As will be discussed below, the VBLANK signal is also input to a microcontroller U7 (FIG. 3C) to determine a vsync quality parameter.

Figure 3B:
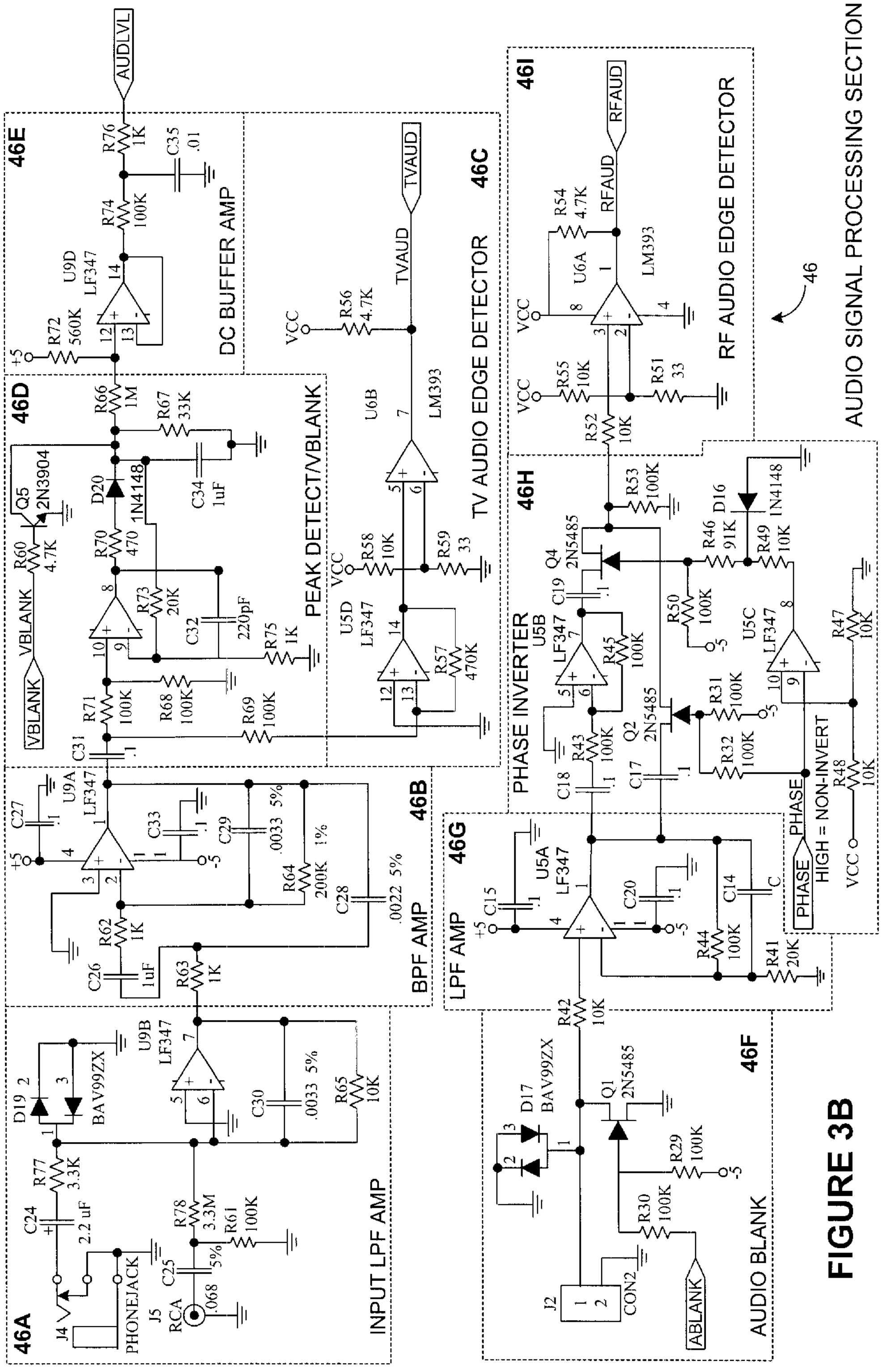

Referring now to FIG. 3B, there is illustrated the audio signal processing section 46. Audio signals from the television set 10 (herein after "television audio") are input to the audio signal processing section 46 via an input low pass filter amplifier 46A having a 3 dB cut-off frequency of approximately 5 kHz. The low pass filter amplifier 46A comprises an amplifier U9B, a resistor R65 and a capacitor C30. As illustrated in FIG. 3B, the television audio may be provided to the low pass filter amplifier 46A via a connector J4 (from the vsync/audio pick-up device 22) or an RCA jack J5 (from a line level output 10*a* in the television set 10). The low pass filter amplifier 46A also serves to filter out high frequency interference signals, such as the horizontal sync signal. It is noted that because the signal amplitude of the line level output 10*a* is greater than the signal input from the vsync/audio pick-up device 22, a voltage divider, consisting of resistors R61 and R78, is provided to attenuate the line-level signal to approximately an amplitude of a signal provided by the vsync/audio pick-up device 22.

The television audio is next fed to a high gain bandpass filter amplifier 46B that includes an amplifier U9A, resistors R62 and R64, and capacitors C26, C28 and C29. The bandpass filter 46B passes frequencies from approximately 50 Hz to 300 Hz. By passing the aforementioned frequencies, the most useful audio information is advantageously provided to the signal strength meter 40. In addition, this audio information is used by the viewership collection meter 18 for audio matching, as will be explained below with respect to FIG. 4. The television audio is then fed to a television audio edge detector circuit 46C comprising comparators U5D and U6B. The television audio edge detector circuit 46C is provided to convert the television audio (a sinusoidal waveform) into a square wave for reasons which will be described below.

The television audio is also fed to a peak detector/Vblank circuit 46D comprising comparator U9C. The peak detector 46D also receives the VBLANK signal generated by the Vblank One Shot circuit 44G. The VBLANK signal turns a transistor Q5 ON and OFF such that the peak television audio amplitude is presented to the microcontroller U7 for sampling immediately preceding the VBLANK pulse. When the VBLANK pulse is inactive (i.e., logic low), the voltage value of the peak television audio amplitude is stored in a capacitor C34 and may be sampled by the microcontroller U7 via a DC buffering amplifier 46E (comparator U9D) as follows. The DC buffering amplifier 46E presents a voltage across the capacitor C35 (e.g., 3.2 V to 5 V) that is proportional to the voltage across the capacitor C34. The microcontroller U7 discharges capacitor C35 and determines the length of time it takes for C35 to recharge to a logic high level. This length of time is directly proportional to the voltage across the capacitor C34, and accordingly, can be used by the microcontroller U7 to determine the peak television audio amplitude level.

When the VBLANK pulse is active (i.e., logic high), the capacitor C34 is discharged and clamped low by a transistor Q5 to prevent noise from the vsync signal affecting the detected peak television audio amplitude. Once the VBLANK signal becomes inactive, the peak detector 46D requires a small period of time to recover and accurately represent the peak television audio amplitude. Accordingly, it is preferable to sample the peak television audio amplitude just prior to the time when the vsync pulse is expected to become active to ensure the proper peak amplitude is presented to the DC buffering amplifier 46E. To this end, the microcontroller U7 contains a timer to enable sampling of the peak television audio amplitude value via the DC buffering amplifier 46E at such times.

A test signal is provided to the signal strength meter 40 via a connector J2 in an audio blank circuit 46F. The test signal is compared to the television audio signal as part of the process by which the pick-up device 22 is optimally positioned by a technician or installer. The test signal is then passed through a low pass filter amplifier 46G, which comprises an amplifier U5A, a resistor R44 and a capacitor C14. The low pass filter amplifier 46G has a 3 dB cut-off frequency of approximately 160 Hz, which serves to eliminate high frequency noise, and the low pass filter 46G approximates the phase delays found in the input low pass filter amplifier 46A. The test signal is fed to a phase inverter 46H (described below) and then to an RF audio edge detector 46I, which comprises a comparator U6A. Similar to the television audio edge detector 46C, the RF edge detector 461 converts the test signal (a sinusoidal waveform) to a square wave.

As described above, the audio signal processing section 46 receives two input signals, the television audio and the test signal. As part of the process to optimally position the pick-up device 22, a predetermined audio frequency signal (e.g., 600 Hz) is input to the television set 10 via, e.g., the 75Ω connector as the audio portion of channel 3 (or other channel) and the audio signal processing section 46 via, e.g., the connector J2 as the test signal, such that a comparison of the phase of the television audio and the test signal may be performed. The video portion of channel 3 may be a blank screen or other predetermined pattern. To compare the phase of the television audio and the test signal, the square wave output from the television audio edge detector 46C is compared by the microcontroller U7 to the square wave output of the RF audio edge detector 461. If the signals are out-of-phase, then the phase inverter 46H is instructed by the microcontroller U7 to invert the test signal such that it is in-phase with respect to the television audio.

It is also noted that the audio blank circuit 46F may also be used to attenuate the predetermined audio signal feeding the television set 10 for use in audio noise floor measurements (described below) by clamping the audio signal from the pattern generator to ground with an analog switch (transistor) Q1 as the audio output of the pattern generator is not buffered. A signal ABLANK is set to logic high by the microcontroller U7 during the audio noise floor measurements. When the signal ABLANK is high, the transistor Q1 is turned ON, which ties the connector J2 to ground.

Figure 3C:
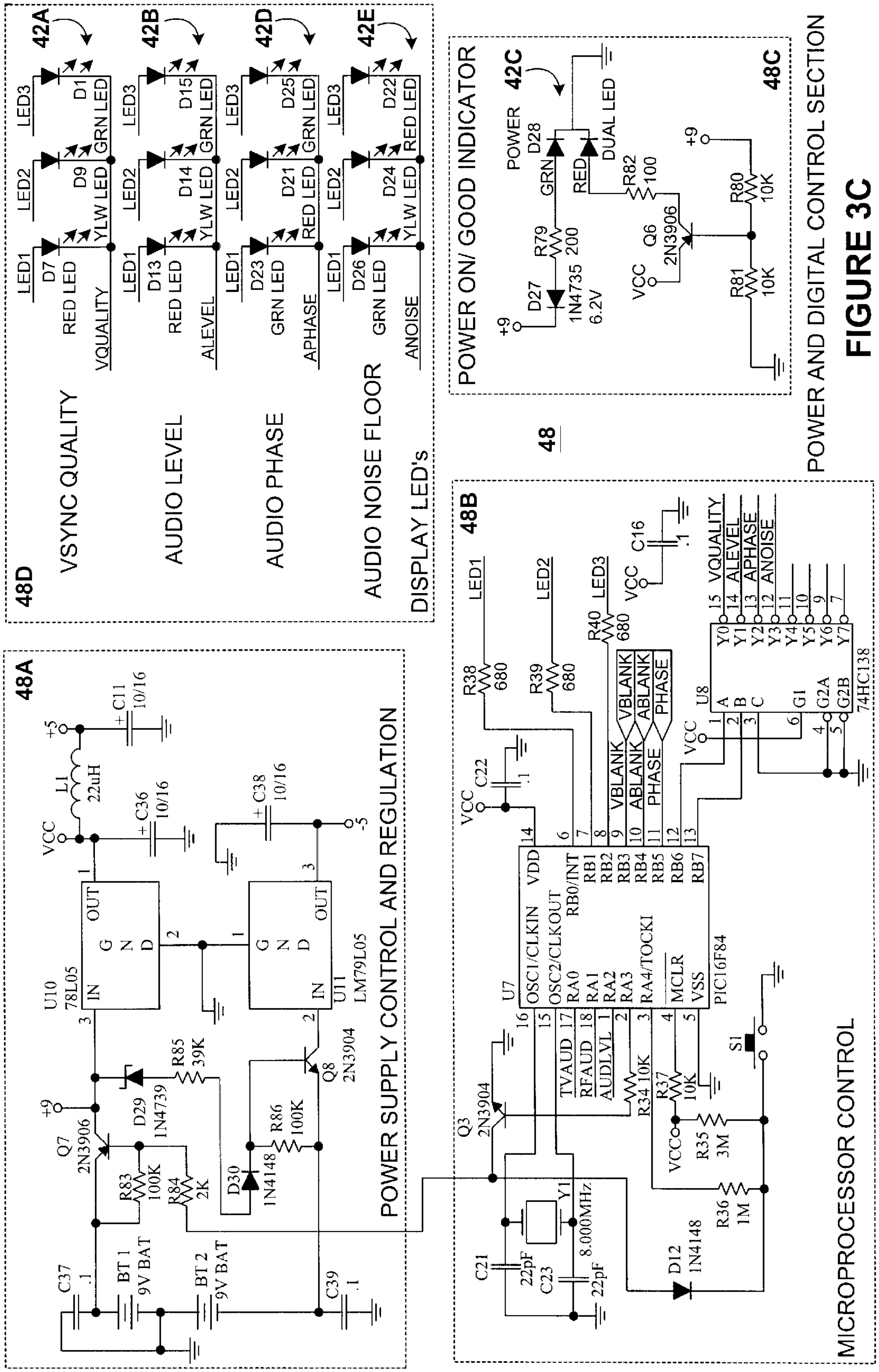

Referring to FIG. 3C, there is illustrated the power and digital control section 48, which controls the operation of the signal strength meter 40.

The signal strength meter 40 is powered by a power supply control and regulation circuit 48A that comprises, e.g., two standard nine-volt batteries BT1 and BT2 and voltage regulators U10 and U11. To power ON and OFF the signal strength meter 40, a user depresses switch S1. When powering the signal strength meter 40 ON, a transistor Q7 is turned ON and current flows from the battery BT1 to the voltage regulator U10. In addition, the voltage present at the regulator input becomes sufficient to exceed the breakdown voltage of the zener diode D29, which allows a transistor Q8 to be turned ON, enabling the negative supply voltage. This action provides power to the microcontroller U7. The microcontroller U7 next turns ON a transistor Q3 to maintain the transistor Q7 in an ON state so the user may release switch S1. A subsequent closure of switch S1 will result in a power OFF command to the microcontroller U7.

The voltage regulators U10 and U11 provide a stable +5 V and −5 V, respectively, to power the circuits. The battery level for the battery BT1 (positive supply) is monitored by a power ON/Good indicator circuit 48C. When the voltage across the batter BT1 falls below approximately 8.2 V, the green LED element of a dual LED D28 (visible through indicia window 42C) will start to dim. At approximately the same time, a transistor Q6 will begin to conduct current, which will light a red LED element of dual LED D28. Since the positive supply has more current demands than the negative supply, monitoring only the positive supply will appropriately indicate when the batteries need replacing.

A microprocessor control circuit 48B is also provided that includes the microcontroller U7 (e.g., PIC16F84, available from Microchip Technology, Inc., Chandler, Ariz., or similar), a 3-to-8 line decoder U8 (e.g., a 74HC138 3-to-8 Line Decoder, manufactured by Philips Semiconductor, Sunnyvale, Calif., or similar), the power ON and OFF switch S1, and other associated circuitry. The microcontroller U7 senses amplitude levels and timing parameters for the vsync and audio signals as well as driving the display LEDs (via decoder U8) which represent these levels and parameters. The microcontroller U7 preferably includes such features as a reduced instruction set (RISC) architecture, an internal RAM (68 Bytes), a data EEPROM memory (64 Bytes), an 8-bit data bus, a timer/counter, eight-level deep stack, and multiple interrupt sources.

As illustrated, four sets of three LEDs are provided in a display LED section 48D that are sequentially addressed using the one of eight address decoder chip U8. The LEDs comprising the display LED section 48D are visible through indicia windows 42A–B and 42D–E. The decoder U8 may comprise a 74HC138, available from National Semiconductor, Santa Clara, Calif., or similar. The decoder chip U8 drives the LEDs at a scan rate of 250 Hz, with each set of three LEDS driven having a 25% duty cycle.

It is noted that the schematics, components, and component values of FIGS. 3A–C are provided herein for exemplary purposes only. Accordingly, the present invention is not limited to the specific structural relationships, components and component values disclosed as other structural relationships, components and component values are intended to be included within the scope of the present invention, as recited in the appended claims. Further, while five indicia windows 42A–E representing five parameters are illustrated in FIG. 2, the present invention is not limited to indicating five parameters, as fewer or greater parameters may be indicated by the signal strength meter 40.

The function of the firmware running on microcontroller U7 is best understood by examining each parameter being measured by the signal strength meter 40.

1. Vsync quality. The vsync quality parameter describes the phase stability of the vsync signal detected by the vsync/audio pick-up device 22. If the vsync/audio pick-up device 22 is positioned incorrectly with respect to the television set 10, the phase of the vsync signal will change slowly at the beat frequency between the detected vsync frequency and 60 Hz. To determine the vsync quality parameter, the VBLANK signal period is sampled eight consecutive times and the period is determined by taking the average of these eight samples and comparing them to the average of the previous eight samples. If the difference between the two averages is less than a first predetermined amount (e.g., 5 $\mu$S), the PREFERRED LED D9 is lit. If the difference is greater than a second predetermined amount (e.g., 25 $\mu$S), the FAIL LED D7 is lit. If the difference of the two averages falls between the two predetermined amounts, the PASS LED D11 is lit.

2. Audio Level. As noted above, the pattern generator feeds a blank screen video signal and a 600 Hz audio tone to the television set 10 over, e.g., channel 3. This constant 600 Hz audio signal is used by the microcontroller U7 to determine the level of the audio signal detected by the vsync/audio pick-up device 22 or input via the RCA line level input. The level is sampled eight consecutive times and an average of the samples is determined. Sampling is performed by changing the AUDLVL signal input pin RA2 to an output pin, which discharges the capacitor C35 by pulling the pin low. The pin RA2 is changed back to an input pin and the microcontroller U7 determines how long it takes for the voltage across C35 to rise to a logic high level. Based on the this average of the samples, the appropriate one of LEDs D13, D14 and D15 is lit, which reflects the audio level sensed.

3. Audio Phase. The audio phase measurement is determined by a comparison of the timing between leading edges of the audio signal sensed or input from the television set and the audio test signal directly input to the signal strength meter 40 from the pattern generator. If the leading edges of the signals are within a preset timing window of each other (e.g., representing a difference of less than 70°), they are considered in-phase and the LED D23 is lit. If the leading edge of one signal is within the preset timing window of the falling edge of the other signal, they are considered to be in inverted phase, and the LED D22 is lit. If the signal edges fall outside of the timing window, they are considered to be out-of-phase and the red LED D21 is lit indicating that the signal may be unusable for audio matching purposes.

4. Audio Noise Floor. The operation of the audio noise floor measurement is similar to the audio level measurement, except that the audio generated by the pattern generator is blanked by the microcontroller U7 using a JFET transistor Q1 in the audio blank circuit 46F. Blanking the audio signal (via audio blank circuit 46F) allows for checking of the ambient noise environment within which the vsync/audio pick-up device 22 or the RCA line-in signal operates. The measurement scale for determining which LED to light is more sensitive than for the audio level measurement. For example, a high noise level indication will be made (by LED D22) at approximately the same level as a low audio level indication.

5. Miscellaneous Microcontroller functions. The microcontroller U7 also monitors the switch SI (ON/OFF button) for a low signal level, which indicates that the button has been depressed. When the signal strength meter 40 is operating, a low signal generated by switch S1 signals the microcontroller to turn power OFF by switching pin 2 (RA3) low, thereby turning OFF the transistor Q3. In addition, the microcontroller turns power OFF if it has been ON for a predetermined period of time, e.g., 4 minutes. This action prolongs battery life, and prevents draining of the batteries if the power is accidentally turned ON or if the technician forgets to turn power OFF.

Figure 4:
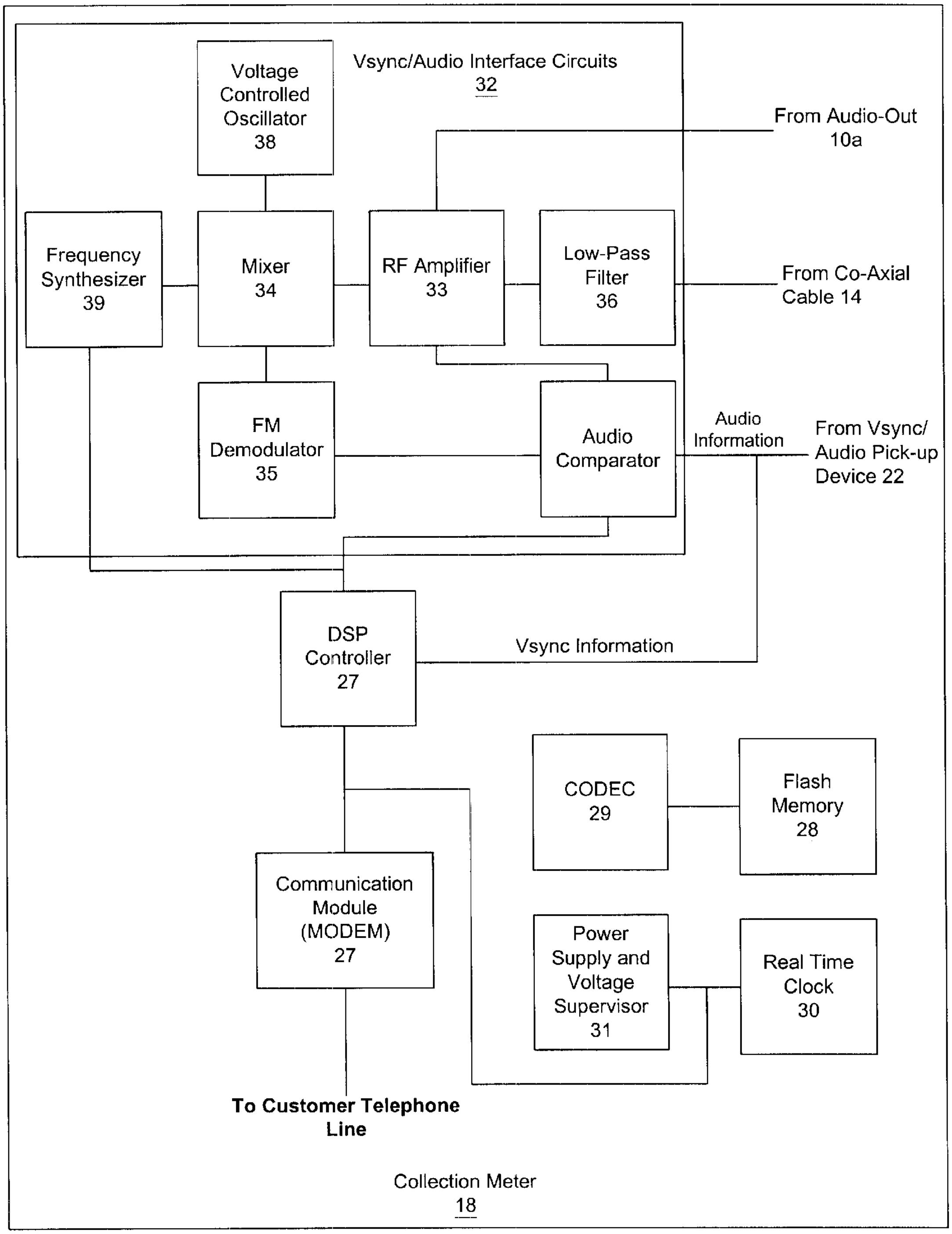
FIG. 4 is a block diagram of an exemplary collection meter in accordance with an aspect of the present invention

FIG. 4 is a block diagram of the exemplary components within the collection meter 18. The collection meter 18 generates "snapshots" of selected channels on cable, satellite and standard air systems and compiles information related to the snapshots. The information may include the channel or channels viewed at a particular time or on a particular day. The compiled information may be used to generate viewership ratings and other research related services for multichannel subscriber television systems (e.g., cable television and satellite television).

The collection meter 18 includes Audio interface circuits 32, a communications module 26, a digital signal processor (DSP) controller 27, a flash memory 28 to store parameters and programming information for the DSP controller 27, a CODEC 30 to provide for compression and decompression of data (e.g., audio or video information) in accordance with predetermined mathematical algorithms, a real time clock 30, and a power supply and voltage supervisor 31. The DSP controller 27 may be programmed to provide functionalities such as, tuning to cable channel frequencies, detection of the state of the television (e.g., powered ON or OFF), detection of the channel being viewed, communication to the communications module 26, management of storage of snapshot information (e.g., time stamp), reception and storage of information related to a telephone number of a central collection site and time for sending snapshot information to the central site, dial-up capability to contact the central site and to upload the snapshot information, and a capability to receive time and reset the onboard real time clock during the upload. Additional features and functionalities may be provided as user requirements change by reprogramming the DSP controller 27. As illustrated, the DSP controller 27 receives information over line 20 from the display interface board 22 (from connection J2).

The dial-up capability is preferably programmed in firmware within the DSP controller 27 and is preferably not programmable by end-users (e.g., viewers). To performed the dial-up function, the communications module 27, which is connected to the customer's telephone line, is taken off-hook in accordance with the V.22 protocol at predetermined times and dual-tone multi-frequency (DTMF) signals are transmitted to call the central collection site. The telephone number of the central collection site is preferably coded into the firmware and may be changed by the central site during data communications. Using the V.22 protocol, the communications module 27 transmits signals representative of the data collected by the collection meter 18 to the central site. As illustrated in FIG. 4, the communications module 27 may comprise a MODEM.

The power supply 31 regulates the voltage to the communications module 27 and the Audio interface circuits 32. The power supply 31 receives, for example, 12VAC and may provide, ±5V and ±12V DC to the modules 27 and 32. The voltage supervisor portion monitors the ±5V and ±12V and resets the DSP controller 26 and the flash memory 28 if the supplied voltage drops below these values. The total power consumption is preferably less than 5 Watts.

The Audio interface circuits 32 include an RF amplifier 33, a mixer 34, an FM demodulator 35, a low-pass filter 36, audio comparator 37, voltage controlled oscillator (VCO) 38, and a frequency synthesizer 39. The broad-band cable signal to the television set 10 enters through a coaxial cable 14 coupled to the Audio interface circuits 32. The audio sub-carrier of a particular cable channel is coupled to the low pass filter 36 and the RF amplifier 33 by a low-loss coupler. The signal is converted to a predetermined frequency (e.g., 3.25 MHz) by the mixer 34, the local oscillator 38 and the frequency synthesizer 39, which is controlled by the DSP controller 27. The predetermined frequency is demodulated by the FM demodulator 35 so the audio program for a tuned channel may be recovered. The audio signal from the television set 10 is obtained from via the vsync/audio pick-up device 22 or from the audio jack 10*a* in the television set 10. The audio signal is fed to the RF amplifier 33 and then into an audio comparator 37. The recovered audio from the FM demodulator 35 is also fed into the audio comparator 37 and compared with the television audio signal. If the audio frequencies match, then a logic high signal is sent by the audio comparator 37 to the DSP controller 27. If there is not a match between the recovered audio from the FM demodulator 35 and the television audio, then the DSP controller 27 tunes the frequency synthesizer 39 to the next channel and continues until a match is found.

The collection meter 18 may be enclosed in an assembly (not shown) that includes internal-metalized plastic covers. The Audio interface circuits 32 may be mounted on the bottom cover and the communication module 27 mounted up-side-down on the top of the Audio interface circuits 32. The display interface circuits 22 may be mounted on the top cover. The assembly may include the following interfaces: a 75Ω cable in (54 MHz to 1 GHZ,–16 dBmV to +10 dBmV), a power adapter in (12 VAC,<420 mA), audio in (1 $V_{p-p}$,100 Hz to 5 kHz,>1 kΩ impedance), a magnetic sensor in (5 mV $_{p-p}$, 100 Hz to 5 kHz, 1 kΩ impedance), a POTS In/Out (RJ–11, meets FCC Part 68 requirements), and a power/mode indicator (green LED).

The various components and specifications noted-above with regard to the collection meter 18 have been provided herein for exemplary purposes only. Other components and different specifications are intended to be within the scope of the present invention. For example, the collection meter 18 may include a microprocessor or microcontroller and associated circuitry to perform the various functions of the DSP controller 27. Further, additional or fewer communications interfaces may be provided (e.g., power line data communication, RF data communication, or digital telephony).

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

For example, the set-top converter box 16 may be modified to include the components of the collection meter 18, such that a single set-top device performs the functions of both devices.

What is claimed is:

1. A signal strength metering device for use in positioning a magnetic pick-up device that receives signals radiated from a television set, said signal strength metering device comprising:

a synchronizing signal processing section including a first filter, a first peak amplitude detection circuit, a first edge detection circuit, and a one-shot circuit, said synchronizing signal processing section receiving a vertical synchronizing signal, and said one-shot outputting a blanking signal upon receipt of a first voltage signal from said first edge detection circuit, said first voltage signal being representative of a peak amplitude of said vertical synchronization signal;

a first audio signal processing circuit including a second filter, a second peak amplitude detection circuit and a second edge detection circuit, said first audio signal processing circuit receiving an audio signal from said television set and said blanking signal, and outputting a second voltage representative of a peak amplitude of said audio signal and a first square wave representation of said audio signal;

a second audio signal processing circuit including a blanking circuit and a third edge detector, said second audio signal processing circuit receiving a test audio signal and outputting a second square wave representative of said test audio signal; and a controller, said controller receiving said second voltage signal representative of said peak amplitude of said audio signal, said first square wave and said second square wave, wherein said controller determines at least one of a quality of said vertical synchronizing signal, a level of said audio signal, a phase of said audio signal, and an audio noise floor measurement.

2. The signal strength metering device as recited in claim 1, said synchronizing signal processing circuit comprising a peak compare circuit comprising at least one comparator, wherein said peak compare circuit determines if a leading edge of said vertical synchronizing signal is a positive edge having a greater amplitude or if the leading edge is a negative edge having a greater amplitude.

3. The signal strength metering device as recited in claim 2, said peak compare circuit further comprising a dual color LED, wherein if the leading edge of said vertical synchronizing signal is positive and greater in amplitude, said dual color LED is illuminated a first color to indicate said vertical synchronizing signal is in-phase, and wherein if the leading edge is negative and greater in amplitude, said dual color LED is illuminated a second color to indicate said vertical synchronizing signal is out-of-phase.

4. The signal strength metering device as recited in claim 1, said first filter comprising a low pass filter and a band pass filter, wherein said band pass filter is tuned to cause said vertical synchronizing signal to ring.

5. The signal strength metering device as recited in claim 1, said first audio signal processing circuit further including a DC buffering amplifier, wherein said DC buffering amplifier presents a second voltage representative of the peak amplitude of said audio signal to said controller.

6. The signal strength metering device as recited in claim 5, wherein said second voltage is sampled by said controller to determine said voltage representative of the peak amplitude of said audio signal.

7. The signal strength metering device as recited in claim 6, wherein said second voltage is presented across a capacitor, and wherein said controller discharges said capacitor and determines a length of time for said capacitor to recharge to a logic high value to determine said voltage representative of a peak amplitude of said audio signal.

8. The signal strength metering device as recited in claim 1, said second audio signal processing circuit further comprising a phase inverter, wherein said controller compares a phase of said first square wave output to a phase of said second square wave, and if said first square wave and said second square wave are out-of-phase, then said phase inverter inverts said test audio signal such that it is in-phase with respect to said audio signal.

9. The signal strength metering device as recited in claim 1, further comprising an LED display, wherein said LED display indicates at least one of said quality of said vertical synchronizing signal, said level of said audio signal, said phase of said audio signal, and said audio noise floor measurement.

10. The signal strength metering device as recited in claim 9, wherein said controller determines said quality of said vertical synchronizing signal by sampling said blanking signal a predetermined number of times, taking an average of the samples, and comparing the average to an average of a previously determined predetermined number of samples, wherein if a difference between the two averages is less than a first predetermined amount a preferred LED of said LED display is illuminated, wherein if the difference is greater than a second predetermined amount a fail LED of said LED display is illuminated, and wherein if the difference of the two averages falls between the first and second predetermined amounts, a pass LED of said LED display is illuminated.

11. The signal strength metering device as recited in claim 9, wherein said level of said audio signal is determined by sampling said audio signal a predetermined number of times and determining an average of the samples, and wherein an audio indicator LED of said LED display is illuminated to reflect said level of said audio signal.

12. The signal strength metering device as recited in claim 9, wherein said phase of said audio signal is determined by comparing a timing between leading edges of said audio signal and said test audio signal, wherein if the leading edges of said audio signal and said test audio signal are within a predetermined timing window of each other, they are determined to be in-phase and a first LED of said LED display is illuminated, wherein if the leading edge of one signal is within said predetermined timing window of the falling edge of the other signal, they are determined to be in inverted phase and a second LED of said LED display is illuminated, and wherein if the signal edges of said audio signal and said test audio signal fall outside of said predetermined timing window, they are determined to be out-of-phase and a third LED of said LED display is illuminated.

13. The signal strength metering device as recited in claim 9, wherein said audio noise floor measurement is determined by blanking said test audio signal, and wherein an ambient noise level is determined by said microcontroller and displayed by a noise level indicator LED of said LED display.

14. The signal strength metering device as recited in claim 1, wherein said signal strength meter is electrically coupled to said magnetic pick-up device and said magnetic pick-up device detects at least one of said synchronization signal and said audio signal, and wherein said magnetic pick-up device provides at least one of said synchronization signal and said audio signal to said signal strength meter.

15. The signal strength metering device as recited in claim 14, wherein said magnetic pick-up device is connected to a viewership meter, said viewership meter comprising an audio matching circuit, said audio matching circuit comparing a local audio signal of a predetermined channel tuned by said viewership collection meter with said audio signal output by said television to which a set-top converter is connected, wherein if said local audio signal and said audio signal match, said viewership collection meter determines that said channel to which said set-top converter box is tuned is said predetermined channel.

16. A signal strength metering device, comprising:

first means for processing a synchronizing signal, said first processing means receiving said synchronizing signal and outputting a blanking signal representative of a positive peak value of said synchronizing signal;

second means for processing a television audio signal and a test audio signal, said second means receiving said television audio signal and said test signal and outputting a voltage representative of an amplitude of said television audio signal, a first square wave representative of said television audio signal, and a second square wave representative of said test signal;

means for controlling said signal strength metering device, said controlling means receiving said blanking signal, said first square wave and said second square wave and determining a quality of said first signal, a level of said second signal, and a phase of said second signal; and means for displaying at least one of said quality of said synchronizing signal, said level of said television audio signal, and said phase of said television audio signal.

17. The signal strength metering device as recited in claim 16, wherein said controlling means determines said quality of said synchronizing signal by sampling said blanking signal a predetermined number of times, taking an average of the samples, and comparing the average to an average of a previously determined predetermined number of samples, and wherein said controlling means instructs said displaying means to display a result of the comparison of the averages.

18. The signal strength metering device as recited in claim 16, wherein said level of said television audio signal is determined by sampling said television audio signal a predetermined number of times and determining an average of the samples, and wherein said controlling means instructs said displaying means to display a result of the comparison of the averages.

19. The signal strength metering device as recited in claim 16, wherein said phase of said television audio signal is determined by comparing a timing between leading edges of said television audio signal and said test audio signal, wherein results of the comparison is displayed by said displaying means.

20. The signal strength metering device as recited in claim 16, wherein said signal strength meter is electrically coupled to a magnetic pick-up device and said magnetic pick-up device detects at least one of said synchronization signal and said television audio signal, and wherein said magnetic pick-up device provides at least one of said synchronization signal and said television audio signal to said signal strength meter.

21. The signal strength metering device as recited in claim 20, wherein said magnetic pick-up device is connected to a viewership meter, said viewership meter comprising an audio matching circuit, said audio matching circuit comparing a local audio signal of a predetermined channel tuned by said viewership collection meter with said audio signal output by said television to which a set-top converter is connected, wherein if said local audio signal and said audio signal match, said viewership collection meter determines that said channel to which said set-top converter box is tuned is said predetermined channel.

22. A signal strength metering device which receives signals from an electronic device, comprising:

a first signal processing circuit comprising a first filter, a first peak amplitude detection circuit, a first edge detection circuit and a one-shot circuit, said first signal processing circuit receiving a synchronizing signal and outputting a second voltage representative of a peak amplitude of said first signal and a first square wave representation of said first signal;

a second signal processing circuit including a second filter, a second peak amplitude detection circuit and a second edge detection circuit, said second signal processing circuit receiving an audio signal and said synchronizing signal, and outputting a voltage representative of a peak amplitude of said second signal and a first square wave representation of said second signal;

a third signal processing circuit including a blanking circuit, a phase inverter and a third edge detector, said third signal processing circuit receiving a third signal and outputting a second square wave representative of said third signal;

a controller, said controller receiving said voltage representative of said peak amplitude of said second signal, said first square wave and said second square wave; and a display comprising a plurality of LEDs, wherein said controller determines at least one of a quality of said first signal, a level of said second signal, and a phase of said second signal, and wherein said display indicates results of the determination of at least one of said quality of said first signal, said level of said second signal, and said phase of said second signal.

23. The signal strength metering device as recited in claim 22, said first signal processing circuit comprising a peak compare circuit comprising at least one comparator, wherein said peak compare circuit determines if a leading edge of said first signal is a positive edge having a greater amplitude or if the leading edge is a negative edge having a greater amplitude.

24. The signal strength metering device as recited in claim 23, said peak compare circuit further comprising a dual color LED, wherein if the leading edge of said first signal is positive and greater in amplitude, said dual color LED is lighted a first color to indicate said first signal is in-phase, and where if the leading edge is negative and greater in amplitude, said dual color LED is lighted a second color to indicate said first signal is out-of-phase.

25. The signal strength metering device as recited in claim 22, said first filter comprising a low pass filter and a band pass filter, wherein said band pass filter is tuned to cause said first signal to ring.

26. The signal strength metering device as recited in claim 22, said second signal processing circuit further including a DC buffering amplifier, wherein said DC buffering amplifier presents a second voltage representative of the peak amplitude of said second signal to said controller.

27. The signal strength metering device as recited in claim 26, wherein second voltage is sampled by said controller to determine said voltage representative of the peak amplitude of said second signal.

28. The signal strength metering device as recited in claim 27, wherein said second voltage is presented across a capacitor, and wherein said controller discharges said capacitor and determines a length of time for said capacitor to recharge to a logic high value to determine said voltage representative of a peak amplitude of said second signal.

29. The signal strength metering device as recited in claim 22, said third signal processing circuit further comprising a phase inverter, wherein said controller compares a phase of said first square wave output to a phase of said second square wave, and if said first square wave and said second square wave are out-of-phase, then said phase inverter inverts said third signal such that it is in-phase with respect to said second signal.

30. The signal strength metering device as recited in claim 22, wherein said controller determines said quality of said first signal by sampling said blanking signal a predetermined number of times, taking an average of the samples, and comparing the average to an average of a previously determined predetermined number of samples, wherein if a difference between the two averages is less than a first predetermined amount a preferred LED of said display is illuminated, wherein if the difference is greater than a second predetermined amount a fail LED of said display is illuminated, and wherein if the difference of the two averages falls between the first and second predetermined amounts, a pass of said LED display is illuminated.

31. The signal strength metering device as recited in claim 22, wherein a phase of said second signal is determined by comparing a timing between leading edges of said second signal and said third signal, wherein if the leading edges of said second signal and said third signal are within a predetermined timing window of each other, they are determined to be in-phase and a first LED of said display is illuminated, if the leading edge of one signal is within said predetermined timing window of the falling edge of the other signal, they are determined to be in inverted phase and a second LED of said display is illuminated, and wherein if the signal edges of said second signal and said third signal fall outside of said predetermined timing window, they are determined to be out-of-phase and a third LED of said display is illuminated.

32. The signal strength metering device as recited in claim 22, wherein said level of said second signal is determined by sampling said second signal a predetermined number of times and determining an average of the samples, and wherein an indicator LED of said display is illuminated to reflect said level of said second signal.

* * * * *

UNITED STATES PATENT AND TRADEMARK OFFICE

CERTIFICATE OF CORRECTION

PATENT NO. : 6,484,316 B1
DATED : November 19, 2002
INVENTOR(S) : Conrad Lindberg It is certified that error appears in the above-identified patent and that said Letters Patent is hereby corrected as shown below:

Column 4,
Line 66, delete "signal,by" and insert -- signal by -- therefor;

Column 6,
Line 55, delete "signal," and insert -- signal. -- therefor;

Column 8,
Line 25, insert -- detail -- after "greater";

Column 9,
Line 39, insert -- is -- after "44C";

Column 11,
Lines 39 and 55, delete "461" and insert -- 46I -- therefor;

Column 12,
Line 24, delete "batter" and insert -- battery -- therefor;

Column 14,
Line 46, delete "performed" and insert -- perform -- therefor;

Signed and Sealed this

Twenty-fifth Day of March, 2003

JAMES E. ROGAN
*Director of the United States Patent and Trademark Office*